(12) United States Patent
Kudo et al.

(10) Patent No.: US 7,842,408 B2
(45) Date of Patent: *Nov. 30, 2010

(54) MAGNETIC FILM, MANUFACTURING METHOD THEREOF AND THIN FILM MAGNETIC HEAD

(75) Inventors: Kazue Kudo, Kanagawa (JP); Gen Oikawa, Kanagawa (JP); Yohji Maruyama, Saitama (JP); Noriyuki Saiki, Kanagawa (JP); Hiromi Shiina, Ibaraki (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 74 days.

This patent is subject to a terminal disclaimer.

(21) Appl. No.: 11/820,598

(22) Filed: Jun. 19, 2007

(65) Prior Publication Data

US 2008/0075977 A1 Mar. 27, 2008

(30) Foreign Application Priority Data

Jun. 19, 2006 (JP) ............................. 2006-168554

(51) Int. Cl.
*G11B 5/33* (2006.01)
*H04R 31/00* (2006.01)

(52) U.S. Cl. .................. 428/800; 428/812; 428/827; 428/828; 428/828.1; 428/829; 428/831; 428/831.2; 29/603.07; 36/126

(58) Field of Classification Search .................. None
See application file for complete search history.

(56) References Cited

U.S. PATENT DOCUMENTS 6,132,892 A * 10/2000 Yoshikawa et al. .......... 428/812

6,797,415 B2 * 9/2004 Yamaguchi et al. ......... 428/812

(Continued)

FOREIGN PATENT DOCUMENTS

JP 2821456 B * 11/1998
JP 2005-063489 3/2005

OTHER PUBLICATIONS

Webster's New Collegiate Dictionary, 1977. p. 15.*
Webster's New Collegiate Dictionary, 1977. p. 34.*

*Primary Examiner*—Jennifer C McNeil
*Assistant Examiner*—Vera Katz
(74) *Attorney, Agent, or Firm*—GMG Intellectual Property Law; Guadalupe M. Garcia (57) ABSTRACT

Embodiments of the present invention provide a magnetic disk drive capable of allowing higher data transfer rates and higher recording densities. According to one embodiment, an upper magnetic core and lower magnetic core comprise a multi-layered magnetic film formed by alternately stacking a face-centered cubic (fcc) crystalline magnetic thin layer and a body-centered cubic (bcc) crystalline magnetic thin layer by plating. The plating bath is such that the temperature is about $30\pm1°$ C., pH is about 2.0–1.0 to 2.0+0.5, metal ion concentrations are about 5 to 25 (g/l) for $Ni^{2+}$ and 5 to 15 (g/l) for $Fe^{2+}$, saccharin sodium concentration is about $1.5\pm1.0$ (g/l), sodium chloride concentration is about $25\pm5$ (g/l), and boric acid concentration is about $25\pm5$ (g/l). Since each layer's crystal structure is different from that of its adjacent lower layer, epitaxial growth is broken within each layer. Thus, since crystal grains are reduced in size, it is possible to lessen the decrease of the permeability $\mu$ at higher frequencies.

9 Claims, 6 Drawing Sheets

U.S. PATENT DOCUMENTS

| | | | |
|---|---|---|---|
| 6,937,446 B2 * | 8/2005 | Kamiguchi et al. | 360/324.1 |
| 2002/0048128 A1 * | 4/2002 | Kamiguchi et al. | 360/324.1 |
| 2002/0106533 A1 * | 8/2002 | Kudo et al. | 428/692 |
| 2003/0184921 A1 * | 10/2003 | Sugita et al. | 360/324.1 |
| 2003/0194581 A1 * | 10/2003 | Saito et al. | 428/694 R |
| 2004/0048104 A1 * | 3/2004 | Shimazawa et al. | 428/693 |
| 2004/0120074 A1 * | 6/2004 | Okada et al. | 360/126 |
| 2004/0169959 A1 * | 9/2004 | Kudo et al. | 360/126 |
| 2004/0234818 A1 * | 11/2004 | Tanahashi et al. | 428/694 TM |
| 2005/0036236 A1 | 2/2005 | Oikawa et al. | |
| 2005/0053802 A1 * | 3/2005 | Miyake et al. | 428/694 T |
| 2006/0008679 A1 * | 1/2006 | Noma | 428/828 |
| 2008/0002308 A1 * | 1/2008 | Kudo et al. | 360/319 |
| 2009/0269618 A1 * | 10/2009 | Kamiguchi et al. | 428/811.1 |

\* cited by examiner

| | |
|---|---|
| $Ni^{2+}$ (g/l) | 5~25 |
| $Fe^{2+}$ (g/l) | 5~15 |
| Sodium Saccharin (g/l) | 1.5±1.0 |
| Anode | Nickel (4N) |
| NaCl (g/l) | 25±5 |
| $H_3BO_3$ (g/l) | 25±5 |
| Temperature (°C) | 30°±1° |
| pH | 2.0+0.5/−1.0 |

Fig.3

|  | step1 | step2 | step3 | step4 | step5 | step6 | step7 | step8 |
|---|---|---|---|---|---|---|---|---|
| Current(mA) | 560 | 1000 | 560 | 1000 | 560 | 1000 | 560 | 1000 |
| time | 0'05" | 0'07" | 0'05" | 0'07" | 0'05" | 0'07" | 0'05" | 0'07" |

MAGNETIC FILM, MANUFACTURING METHOD THEREOF AND THIN FILM MAGNETIC HEAD

CROSS-REFERENCE TO RELATED APPLICATION

The instant nonprovisional patent application claims priority to Japanese Patent Application No. 2006-168554 filed Jun. 19, 2006 and incorporated by reference in its entirety herein for all purposes.

BACKGROUND OF THE INVENTION

Magnetic recording and reproducing apparatuses, typically, magnetic disk drives, have been required to provide higher data transfer rates and higher recording densities. This has resulted in the use of higher coercivity recording media. With regard to thin film magnetic heads, it is desired to maximize the coil current to recording magnetic field conversion efficiency since the recording frequency must be raised to cope with the demand for higher data transfer rate. To raise the conversion efficiency, the hysteresis loss of the magnetic cores should be reduced by using a low Hc/Hk material to lower their coercivity (Hc) along the hard axis or anisotropy magnetic field (Hk). Further, to reduce the eddy loss, the resistivity ($\rho$) of the material should be high.

Conventionally, low Hc(1.0-1.50 Oe) and high $\rho$(40-50 $\mu\Omega$cm) 52-58 wt % FeNi alloy plated films (Hk: 5-100 Oe, Bs: 1.65-1.75 T) have been used to constitute magnetic cores.

Further, as described in Japanese Laid-Open Patent No. 2005-63489 ("Patent Document 1"), a low Hc(0.5-1.5 Oe), low Hk(0.5-1.5 Oe) and high Bs (2.1-2.3 T) 84-92 wt % FeNi alloy plated film has been developed to realize higher frequency recording. Forming of a lustrous film having such properties is made possible by controlling the pH of the plating bath to an acidity value of 1.5-2.3. Otherwise, the film whitens or blackens due to the roughness of the plated surface if the Fe content is increased beyond 60 wt % (Fe≧60 wt %). Use of this 84-92 wt % FeNi in a thin film magnetic head improves its frequency response. Evaluation of thin film magnetic heads by using L=0.006 $\mu$H as a barometer level showed that 84-92 wt % FeNi raises the allowable frequency f to 700-800 MHz from the frequency of 500-600 MHz by 52-58 wt % FeNi. It was also found that this frequency can be raised further to 900-1000 MHz by thermal treatment. That is, use of the 84-92 wt % FeNi allows a thin film magnetic head to output the required level of magnetic field at higher recording frequencies.

In order to improve a magnetic disk drive in data transfer rate and recording density, the magnetic cores of the thin film magnetic heads should be made of a high performance magnetic film which does not exhibit either a large hysteresis/eddy loss or a large permeability ($\mu$) decrease at high recording frequencies. As the properties of the material, low Hc, low Hk, high $\rho$ and high Bs are required.

In order to solve this problem, a lustrous and uniform FeNi alloy plated film of which Fe content is 84-92 wt % was developed as described in Patent Document 1. Based on this material, the inventors successfully formed a low Hc (0.8 Oe), low Hk(1.0 Oe), high Bs(2.2 T) and high $\rho$ (35 $\mu\Omega$cm) 88Fe12Ni plated film as the upper magnetic core and a similar 88Fe11Ni1Cr plated film ($\rho$: 40 $\mu\Omega$cm, Hc: 1.4 Oe, Hk: 2.0 Oe, Bs: 2.0 T) as the lower magnetic core. While the recording frequency can be raised up to 700-800 MHz, however, this composition cannot fully meet the demand for longitudinal/perpendicular recording thin film magnetic heads capable of recording at 1000-2000 MHz.

BRIEF SUMMARY OF THE INVENTION

Embodiments in accordance with the present invention provide a magnetic disk drive capable of allowing higher data transfer rates and higher recording densities. According to the particular embodiment shown in FIG. 8, an upper magnetic core 37 and lower magnetic core 31 comprise a multi-layered magnetic film formed by alternately stacking a face-centered cubic (fcc) crystalline magnetic thin layer and a body-centered cubic (bcc) crystalline magnetic thin layer by plating. The plating bath is such that the temperature is about 30±1° C., pH is about 2.0−1.0 to 2.0+0.5, metal ion concentrations are about 5 to 25 (g/l) for Ni2+ and 5 to 15 (g/l) for Fe2+, saccharin sodium concentration is about 1.5±1.0 (g/l), sodium chloride concentration is about 25±5 (g/l), and boric acid concentration is about 25±5 (g/l). Since each layer's crystal structure is different from that of its adjacent lower layer, epitaxial growth is broken within each layer. Thus, since crystal grains are reduced in size, it is possible to lessen the decrease of the permeability $\mu$ at higher frequencies.

DETAILED DESCRIPTION OF THE INVENTION

Embodiments in accordance with the present invention relate to magnetic films and thin film magnetic heads using magnetic films. More particularly, embodiments of the present invention concerns the structure and manufacturing method of a magnetic film.

In consideration of the problems mentioned above, a first object of embodiments of the present invention is to provide a magnetic film of which permeability μ decreases less at higher recording frequencies.

A second object of embodiments according to the present invention is to provide a thin film magnetic head capable of showing high performance at high recording frequencies.

To achieve the above-mentioned first object, a magnetic film according to embodiments of the present invention comprises a multi-layered magnetic film which is formed by alternately stacking a body-centered cubic crystalline magnetic plated thin layer and a face-centered cubic crystalline magnetic plated thin layer.

The thickness of the body-centered cubic crystalline magnetic plated thin layer may be larger than that of the face-centered cubic crystalline magnetic plated thin layer.

Either the body-centered cubic crystalline magnetic plated thin layer or the face-centered cubic crystalline magnetic plated thin layer may be 0.5 to 20 nm in thickness.

The total composition of the multi-layered magnetic film may satisfy $15 \leq Ni \leq 60$ wt % and $40 \leq Fe \leq 85$ wt %.

The composition of the body-centered cubic crystalline magnetic plated thin layer may satisfy $10 \leq Ni \leq 30$ wt % and $70 \leq Fe \leq 90$ wt % and the composition of the face-centered cubic crystalline magnetic plated thin layer may satisfy $55 \leq Ni \leq 75$ wt % and $25 \leq Fe \leq 45$ wt %.

To achieve the above-mentioned first object, a magnetic film fabrication method according to embodiments of the present invention comprises:

a first step of forming a magnetic thin layer by plating wherein the composition of the magnetic thin layer satisfies $55 \leq Ni \leq 75$ wt % and $25 \leq Fe \leq 45$ wt %; and a second step of forming a magnetic thin layer by plating wherein the composition of the magnetic thin layer satisfies $10 \leq Ni \leq 30$ wt % and $70 \leq Fe \leq 90$ wt %;

wherein a magnetic film comprising a multi-layered magnetic film is formed by alternately executing the first step and the second step.

Preferably, the first step and the second step are executed in such a plating bath that the temperature is 30±1° C., pH is 2.0–1.0 to 2.0+0.5, metal ion concentrations are 5 to 25 (g/l) for $Ni^{2+}$ and 5 to 15 (g/l) for $Fe^{2+}$, saccharin sodium concentration is 1.5±1.0 (g/l), sodium chloride concentration is 25±5 (g/l), and boric acid concentration is 25±5 (g/l).

To achieve the above-mentioned second object, a thin film magnetic head according to embodiments of the present invention comprises:

a read head; and a write head which is located adjacent to the read head and has plural magnetic films;

wherein at least one of the plural magnetic films constituting the write head comprises a multi-layered magnetic film which is fabricated by alternately stacking a body-centered cubic crystalline magnetic plated thin layer and a face-centered cubic crystalline magnetic plated thin layer.

According to embodiments of the present invention, it is possible to provide a magnetic film of which permeability μ decreases less at high recording frequencies. As well, it is possible to provide a thin film magnetic head exhibiting high performance at high recording frequencies.

Figure 8:
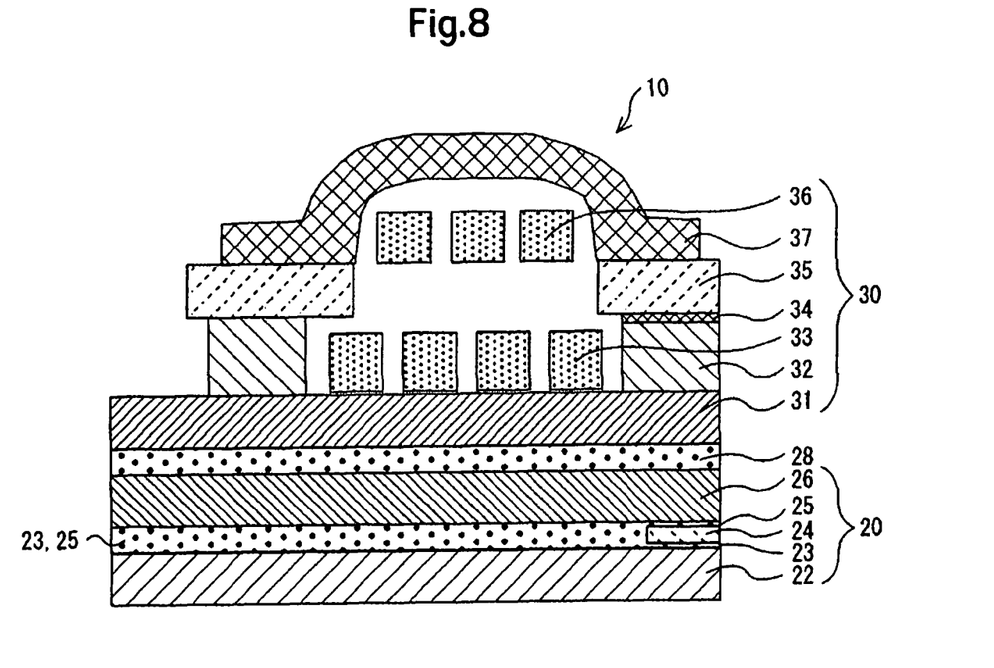
FIG. 8 shows a cross-sectional view of a thin film magnetic head in accordance with a second embodiment.

With reference to the drawings, the following will describe embodiments of the present invention with regard to the configuration and fabrication method of a magnetic film and the configuration of a thin film magnetic head. Firstly, with reference to FIG. 8, the configuration of a longitudinal magnetic recording thin film read/write head (hereinafter, thin film magnetic head) 10, which has a read head 20 and a write head 30, is described below. Shown in FIG. 8 is a section of the head's transducer portion cut in the head's depth direction. The read head 20 comprises a lower magnetic shield 22 formed on a substrate not shown in the figure, an upper magnetic shield 26, and a read transducer 24 formed between the lower magnetic shield 22 and the upper magnetic shield 26 via a lower gap film 23 and an upper gap film 25. The read transducer 24 may be a MR (Magnetoresistive) sensor, a GMR (Great Magnetoresistive) sensor, a TMR (Tunneling Magnetoresistive) sensor or the like. The write head 30, which is an inductive magnetic head formed on the read head 20 via a dielectric separation film 28, comprises a lower magnetic core 31, a lower magnetic pole 32, a lower coil 33, a magnetic gap film 34, an upper magnetic pole 35, an upper coil 36 and an upper magnetic core 37. The lower coil 33 and the upper coil 36 are formed in an organic insulation film.

In order to improve the high frequency performance of the upper magnetic core 37 and lower magnetic core 31 used in the write head 30 of the above-mentioned thin film magnetic head 10, the upper magnetic core 37 and lower magnetic core 31 are formed as magnetic films composed of size-controlled small crystal grains. In the embodiment described below, each of the magnetic films which respectively constitute the upper magnetic core 37 and lower magnetic core 31 is formed by alternately depositing magnetic plated thin layers having different crystal structures. Each layer breaks the epitaxial growth from the lower layer, resulting in size-controlled small crystal grains.

Figure 2:
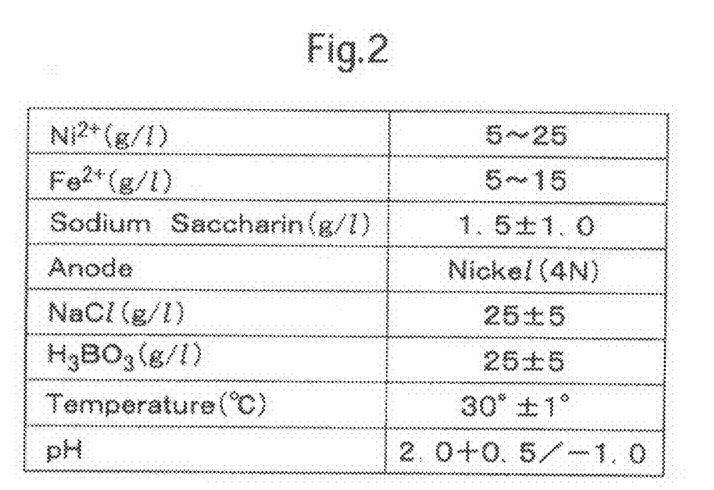
FIG. 2 shows the composition of a plating bath for forming a multi-layered magnetic film.

The following describes how a magnetic film is fabricated as a magnetic core. On a prepared ceramic, glass or Si substrate of 5 inches in diameter, a double-layered film (Au/Cr=20/5 nm) is formed by sputtering as a conductive foundation film for plating. Then, plating is done in a plating solution whose composition is shown in FIG. 2. The plating solution of FIG. 2 is such that the temperature is 30±1° C., metal ion concentrations are 5 to 25 (g/l) for $Ni^{2+}$ and 5 to 15 (g/l) for $Fe^{2+}$, saccharin sodium concentration is 1.5±1.0 (g/l), sodium chloride concentration is 25±5 (g/l), and boric acid concentration is 25±5 (g/l). In the plating tank, 250 l of the solution is used ($N_2$ bubbling purge included). Preferably, the ratio of the Ni ion concentration to the Fe ion concentration is designed to be not smaller than 1.5 (Ni ions/Fe ions≧1.5). To suppress the growth of crystal grains, the pH must be not higher than 2.5. However, if the pH is lower than 1, the plating deposition efficiency is remarkably low since hydrogen-generating reactions are dominant.

A constant current power supply was used for supplying plating electricity. Using a personal computer, it is possible to program up to 14 plating steps which differ in time and current. The time can be set in seconds for DC current and in milliseconds for pulse current. The current can be set in mA. The magnetic field applied during plating was 1 kOe (80 kA/m). For film thickness/composition measurement, a fluorescent X-ray analyzer was used. For measurement of magnetic characteristics Hc, Hk and Bs, a thin film use B-H tracer was used.

Figure 4:
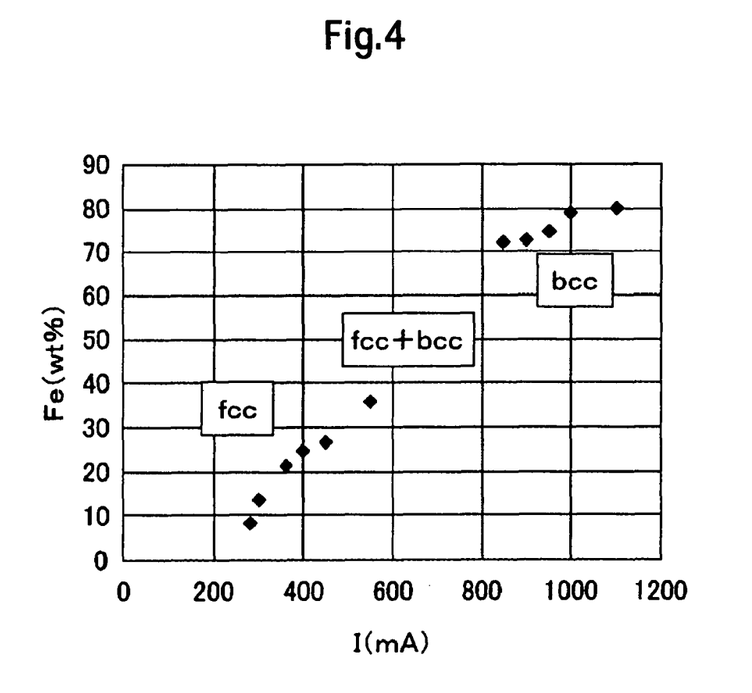
FIG. 4 shows how the Fe content of a FeNi plated thin film formed by using the plating bath of FIG. 2 changes depending on the plating current.

FIG. 4 shows how the Fe content of a film deposited by using the plating bath of FIG. 2 changes depending on the plating current. As shown, a lower plating current results in a higher Ni content of the film while increasing the plating current almost linearly increases the Fe content of the film. The Ni or Fe content of the film formed in the plating bath of FIG. 2 can be changed between 5 and 90 wt % ($5 \leq Ni \leq 90$ wt %) or between 10 and 95 wt % ($10 \leq Fe \leq 95$ wt %) by changing the plating current. If their concentrations in the plating bath are not in their respective ranges shown in FIG. 2, the plated film can not be varied in composition so widely as shown in FIG. 4 by changing the plating current.

Figure 5:
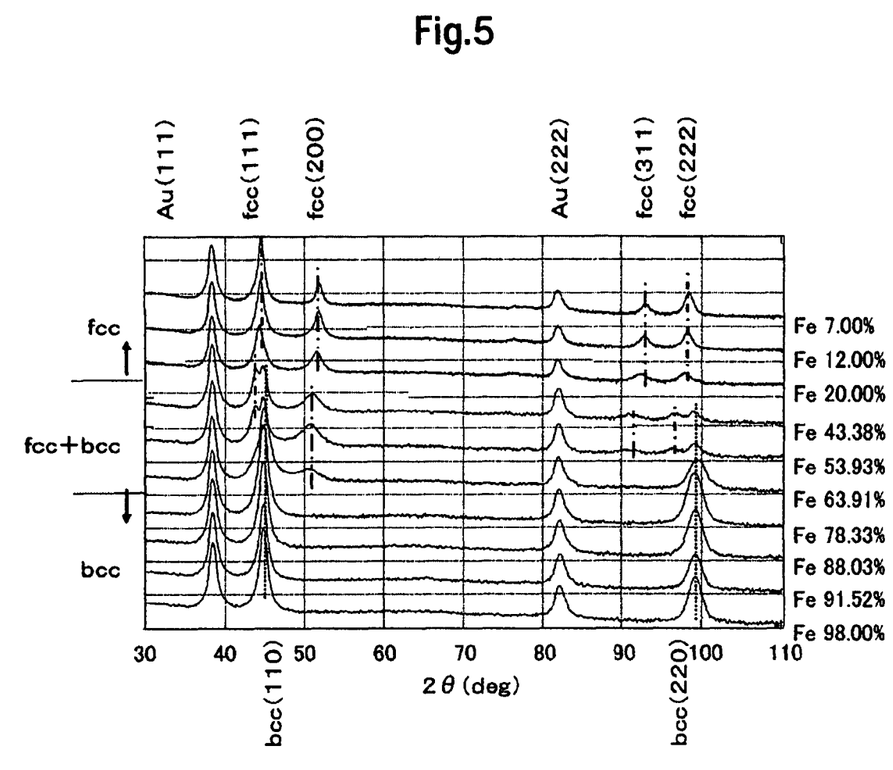
FIG. 5 shows X-ray diffraction patterns obtained from FeNi thin films formed by plating in the plating bath of FIG. 2.

Shown in FIG. 5 are X-ray diffraction patterns obtained from magnetic films fabricated under the above-mentioned conditions. As understood from this, if the Ni content of a magnetic film is high (Ni>70 wt %), the film's crystal structure is face-centered cubic (fcc) and if the Fe content is high (Fe>70 wt %), the crystal structure is body-centered cubic (bcc). If the composition is intermediary between them, the film contains both fcc and bcc structures.

Figure 3:
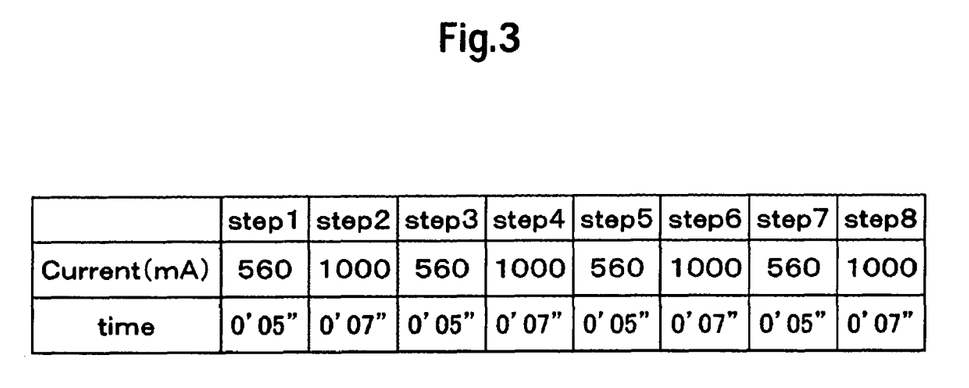
FIG. 3 is a current recipe for forming a multi-layered magnetic film.

As a first embodiment, a magnetic film which comprises a magnetic core was formed by performing plating in the plating bath of FIG. 2 according to a current recipe shown in FIG. 3. Throughout the plating operation from the beginning to the end, the same plating tank was used. Note that time 0' 05" in FIG. 3 means 0 minute and 5 seconds. In the recipe, each of plating steps 1, 3, 5 and 7 deposits a 4.26 nm thick magnetic layer whose composition is Ni73Fe27 wt %. Likewise, each of steps 2, 4, 6 and 8 deposits a 4.5 nm thick magnetic layer whose composition is Ni22Fe78 wt %. Steps 1 through 8 were sequentially repeated 25 times, forming a 876 nm thick multi-layered film whose total composition is Ni46.8Fe53.2 wt %. To raise its total Bs, this plated multi-layered film is mainly composed of Fe rich magnetic thin layers of the bcc crystal structure. Plated fcc crystalline magnetic thin layers are inserted in order to break the epitaxial growth. Preferably, each magnetic thin layer of the fcc crystal structure is not thinner than 0.5 nm to break the epitaxial growth.

Figure 6:
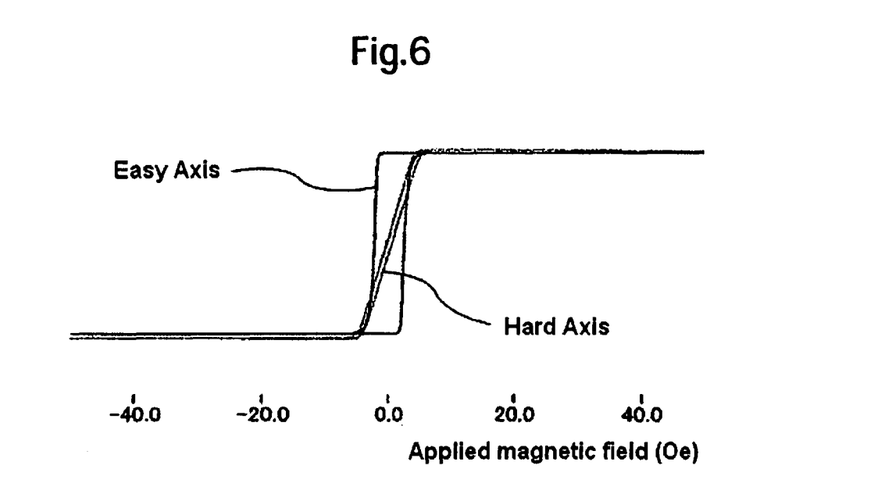
FIG. 6 shows B-H curves of a FeNi multi-layered magnetic film which comprises a magnetic core in accordance with the first embodiment.

Shown in FIG. 6 are B-H curves of this magnetic film. This film's magnetic characteristics are such that Hch (coercive force along the hard axis) is 0.4 Oe (32 kA/m), Hce (coercive force along the easy axis) is 2.4 Oe (192 kA/m), Hk (anisotropy field) is 6.00 Oe (480 KA/m), $\lambda$ (magnetostrictive coefficient) is $45^{-7}$ and Bs (saturation magnetic flux density) is 1.74 T. Thus in magnetic characteristics, this film is almost same as a single-layered Ni46Fe54 wt % film.

Figure 1:
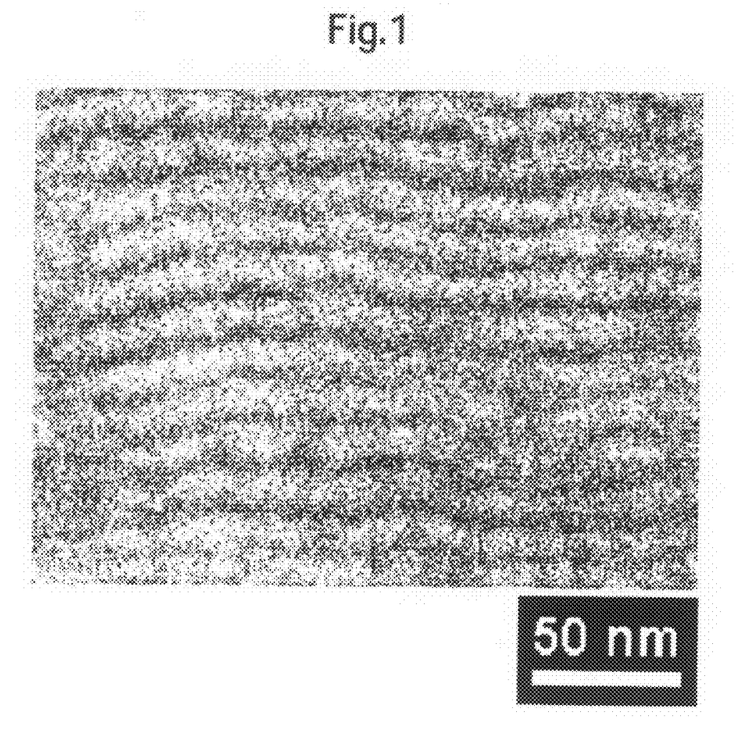
FIG. 1 is a TEM photograph of a section of a multi-layered magnetic film which comprises a magnetic core in accordance with a first embodiment.

By controlling the plating current/time as shown in FIG. 3, it is possible to fabricate a multi-layered magnetic film of which total Ni or Fe content ranges between 15 and 60 wt % ($15 \leq Ni \leq 60$ wt %) or between 40 and 85% ($40 \leq Fe \leq 85$ wt %). FIG. 1 shows a TEM photograph of a section of a plated film which was fabricated as mentioned above. Fe mapping is done on the TEM photograph. In FIG. 1, Fe rich layers look whitish while Ni rich layers look blackish. This result indicates the thickness of each magnetic plated layer can be controlled almost as desired. Note that by setting the plating current to 200-600 mA for each face-centered cubic crystalline layer and to 800-1200 mA for each body-centered cubic crystalline layer, it is possible to fabricate a magnetic film which is almost the same in magnetic characteristics as the above-mentioned magnetic film embodiment.

The above-mentioned magnetic film is a multi-layered magnetic plated film fabricated by alternately stacking face-centered cubic (fcc) crystalline thin layers and body-centered cubic (bcc) crystalline thin layers. Since each thin layer differs in crystal structure from the adjacent thin layers, the epitaxial growth is broken, resulting in size-controlled small crystal grains which are not larger than the thickness of the layer. Note that it is not necessary to form the whole magnetic film as a multi-layered film. That is, multi-layering or alternate stacking of face-centered cubic (fcc) and body-centered cubic (bcc) crystalline layers may be limited to the top, bottom or intermediary part of the magnetic film.

Figure 7:
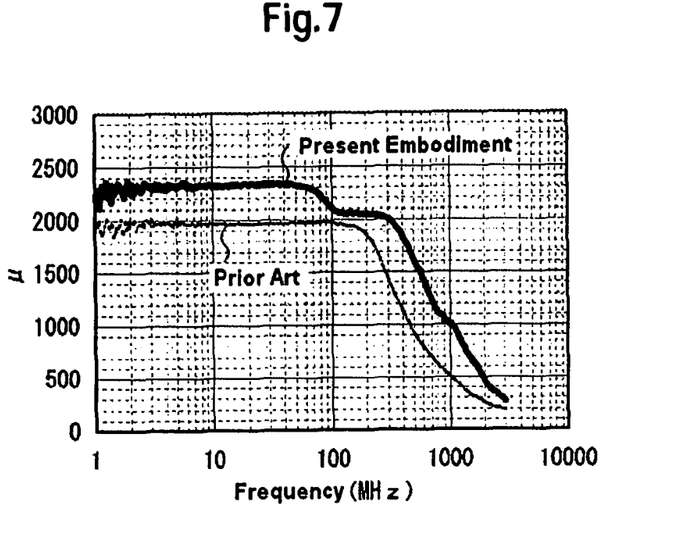
FIG. 7 shows the frequency dependence of the permeability of the multi-layered magnetic film which comprises a magnetic core in accordance with the first embodiment.

FIG. 7 shows results of examining the frequency dependence of the permeability $\mu$ of the above-mentioned multi-layered magnetic film according to an embodiment of the invention and that of a conventional single-layered film. The total composition of either film is Ni46Fe54 wt %. At high frequencies, the multi-layered magnetic film shows a smaller degrease of the permeability $\mu$ than the single-layered film. This means an improvement in the high frequency performance. Also note that while the constituent magnetic plated thin layers of the above-mentioned multi-layered film embodiment are designed to have thicknesses 4.26 nm and 4.5 nm respectively, almost the same magnetic characteristics can be obtained if each face-centered cubic (fcc) crystalline layer is thicker than each body-centered cubic (bcc) crystalline layer although the thickness of each layer of either crystal structure must be in the range of 0.5 to 20 nm. In view of composition, almost the same magnetic characteristics can be obtained if the composition of each face-centered cubic crystalline layer is $55 \leq Ni \leq 75$ wt % or $25 \leq Fe \leq 45$ wt % and that of each body-centered cubic crystalline layer is $10 \leq Ni \leq 30$ wt % or $70 \leq Fe \leq 90$ wt %.

Then, turning again to FIG. 8, the following describes the configuration of a thin film magnetic head in which the above-mentioned NiFe multi-layered magnetic film is used to form the upper and lower magnetic cores in accordance with a second embodiment. This description is made along the manufacture process. On the non-magnetic substrate (not shown in the figure), the lower magnetic shield 22 and lower gap film 23 are formed. On the lower gap film 23, a MR, GMR or TMR sensor is formed as the read transducer 24. At each side of the read transducer 24, a magnetic domain control layer and electrode film are formed although they are not shown in the figure. Then, after the upper gap film 25 is formed on the read transducer 24 and electrode films, the upper magnetic film 25 is formed to complete the read head 20.

Then, after the insulation film 28 is formed on the top of the read head 20, the lower magnetic core 31 is formed thereon by depositing a Ni46Fe54 wt % film by plating. In more detail, after the insulation film 28 is formed, a 40-50 nm Ni80Fe20 wt % film is formed by sputtering as an underlayer for plating. A NiCr, Ta or other film of several nm may be formed as an adhesion layer before the underlayer is formed. On the underlayer, a resist pattern is formed in preparation for deposition of the lower magnetic core 31. Plating is done through the opening of the resist pattern. By cyclically changing the plating current according to the current recipe shown in FIG. 3, a multi-layered film is developed to a desired thickness in the plating bath of FIG. 2. This multi-layered magnetic film has almost the same composition as the above Ni46.8Fe53.2 wt % film mentioned above as the first embodiment.

Then, after an alumina film is deposited by sputtering, the lower magnetic core 31 is planarized by CMP. Then, a 100 nm CoNiFe film is deposited by sputtering to form lower magnetic poles 32. This CoNiFe film is extended to a predetermined thickness by plating. Then, after an insulation film, organic insulation film and lower coil 33 are formed between the front and rear lower magnetic poles 32, an alumina film is deposited by sputtering. Then, the lower magnetic poles 32 are planarized by CMP. Then, after a 50-100 nm write gap film 34 is deposited thereon, an 100 nm underlayer film is deposited by sputtering. Then, a resist frame is formed in preparation for deposition of the upper magnetic pole 35. A CoNiFe film and Ni46Fe54 film are deposited in this order.

Then, a trimming process, such as ion milling, is performed to remove the resist and the unnecessary portions of the underlayer film and trim the upper magnetic pole 35 and lower magnetic pole 32 according to a predetermined track width. Then, after an alumina film is deposited by sputtering, the upper magnetic pole 35 is planarized by CMP and the organic insulation film and upper coil 36 are formed. Then, a multi-layered magnetic film is formed as the upper magnetic core 37 by plating. The upper magnetic core 37 is fabricated as follows. A 40-100 nm thick magnetic film is deposited as the underlayer by sputtering. A NiCr, Ta or other film of several nm may be formed as an adhesion layer before the underlayer is formed. On the underlayer, a resist pattern is formed in preparation for deposition of the upper magnetic core 37. Plating is done through the opening of the resist pattern. By cyclically changing the plating current, a multi-layered film of which total composition is Fe64Ni46 wt % is developed in the same plating bath.

Figure 9:
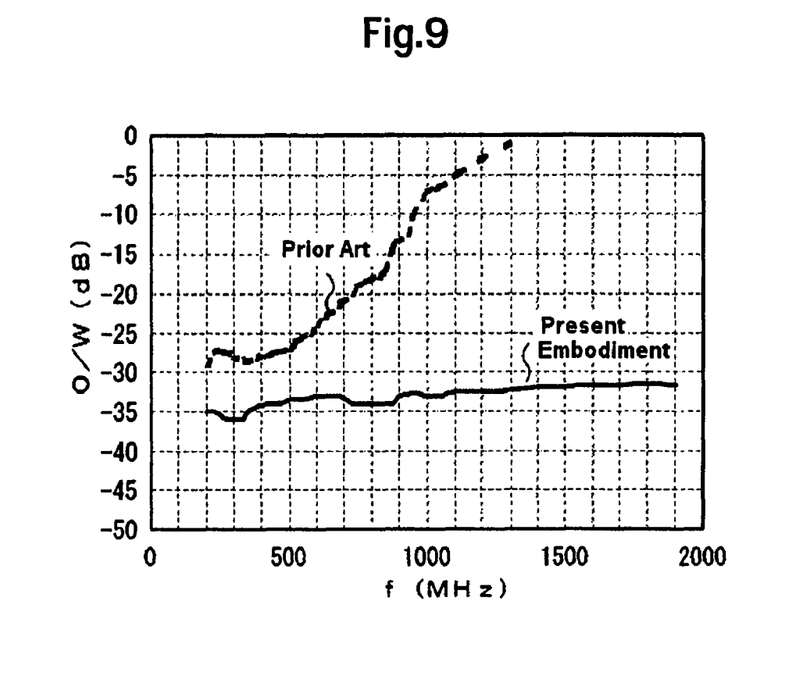
FIG. 9 shows the overwrite performance's frequency dependence of the thin film magnetic head in accordance with the second embodiment.
Figure 10:
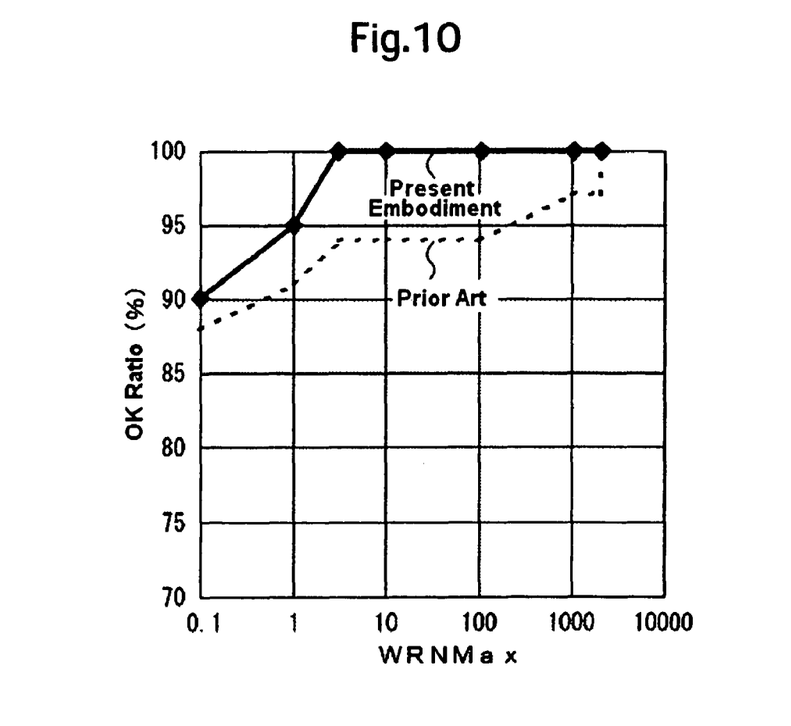
FIG. 10 concerns the after-write read noise from the thin film magnetic head in accordance with the second embodiment.

Since the above-mentioned thin film magnetic head uses multi-layered magnetic films as the upper and lower magnetic cores, it is possible to lessen the decrease of the permeability μ at high recording frequencies. FIG. 9 shows results of measuring the frequency dependence of this thin film magnetic head's overwrite performance. In the case of the present thin film magnetic embodiment, overwrite (O/W) performance does not deteriorate even at high frequencies beyond 1000 MHz. Further, FIG. 10 shows results of measuring the after-write read noise from this head. The term "after-write read noise" means a phenomenon in which after data is recorded on the magnetic disk, noise is produced on the read output during the subsequent read operation. The horizontal axis represents the maximum noise occurrence frequency (WRNMax) and the vertical axis represents the noise OK ratio for the corresponding occurrence frequency. As shown in FIG. 10, after-write read noise was observed from a prior art thin film magnetic head. In the case of the present thin film magnetic head embodiment, no after-write read noise was observed. This is because since the upper and lower magnetic cores are composed of size-controlled small crystal grains, disturbance of the magnetic domain structure which depends on these crystal grains is not so large as to have influence on the read head. It is therefore verified that the multi-layered magnetic film is also effective to reduce the after-write read noise from the read head.

In the case of the above-mentioned second embodiment, although multi-layered plating is used to form both upper and lower magnetic cores, the same kind of effect can be obtained by applying the multi-layered magnetic film to only one of the upper and lower magnetic cores. In addition, it is not necessary to form the whole upper/lower magnetic core as a multi-layered film. That is, multi-layering or alternate stacking of face-centered cubic (fcc) and body-centered cubic (bcc) crystalline layers may be limited to the top, bottom or intermediary part of the magnetic film.

Figure 11:
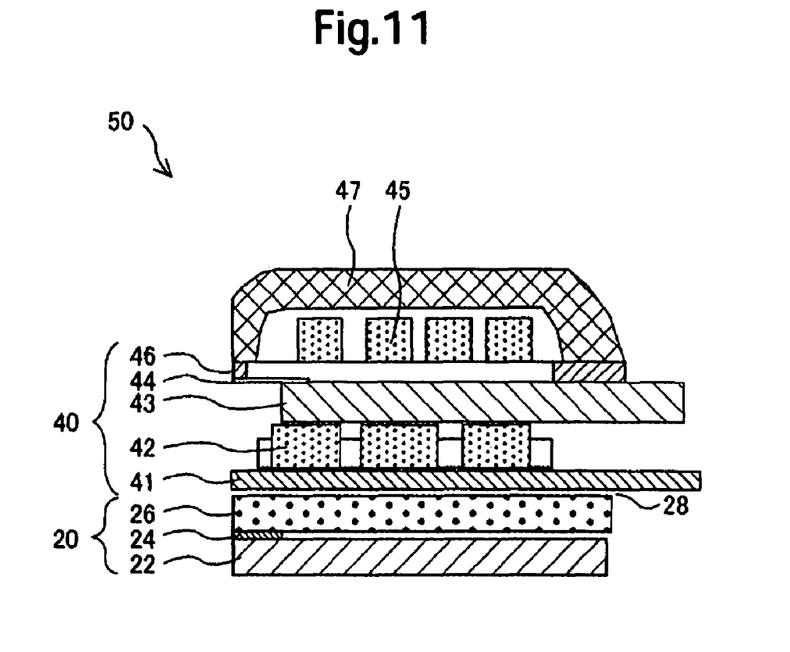
FIG. 11 shows a cross-sectional view of a perpendicular magnetic recording thin film read/write head in accordance with a third embodiment.

As a third embodiment, FIG. 11 shows a perpendicular magnetic recording thin film read/write head 50 in which the above-mentioned multi-layered magnetic film is used. Its read head 20 has the same configuration as the above-mentioned second embodiment. Its write head 40 comprises an auxiliary magnetic pole 41, lower coil 42, yoke 43 (whose rear portion is magnetically connected with the auxiliary magnetic pole 41), main magnetic pole 44 (at the front end of the yoke 43), upper coil 45, wraparound shield 46 and wrap-around shield connecting section 47 which are formed on the read head 20 via an insulation film 28. As the main magnetic pole 44, a FeCoNi plated film (saturation flux density Bs>2.4 T) is formed. As the auxiliary magnetic pole 41, a multi-layered magnetic film (total composition: Ni46Fe54 wt %) is formed in the same manner as the above-mentioned first embodiment. Consequently, it is verified that as compared with conventional perpendicular magnetic recording thin film read/write heads, it is possible at high frequencies not only to lessen the decrease of the permeability μ and deterioration of the overwrite (O/W) performance, but also reduce the after-write read noise. It is also verified that the same kind of effect can be obtained for the high frequency performance by using the above-mentioned multi-layered film to form the yoke 43. In addition, forming the main magnetic pole film by sputtering does not cause a change in this effect.

Figure 12:
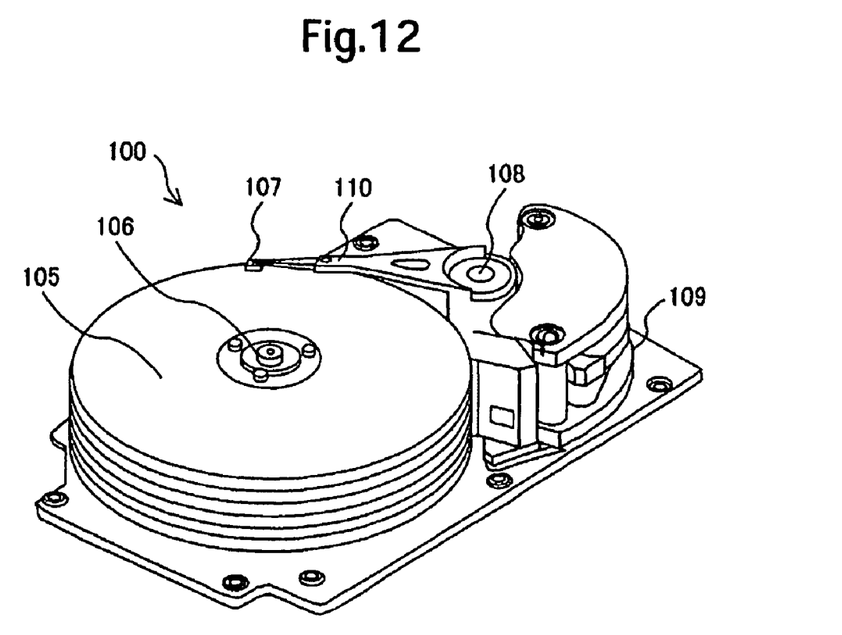
FIG. 12 schematically shows the configuration of a magnetic disk drive.

FIG. 12 schematically shows the configuration of a magnetic disk drive which employs the above-mentioned longitudinal or perpendicular magnetic recording read/write head. A magnetic disk drive 100 comprises magnetic disks 105 to record information thereon, a motor 106 to rotate the magnetic disks 105, thin film magnetic heads 107 to write and read information to and from the magnetic disks 105, suspensions 110 to carry the thin film magnetic heads 107 and an actuator 108 and voice coil motor 109 to move the thin film magnetic heads 107 to a target position on the magnetic disks 105 via the suspensions 110. Further, the magnetic disk drive 100 includes a magnetic disk rotation control circuit, head positioning control circuit and read/write signal processing circuit although they are not shown in the figure. As for each of the thin film magnetic heads 107, the above-mentioned longitudinal or perpendicular magnetic recording thin film read/write head embodiment is used.

This magnetic disk drive is a high performance and high quality magnetic disk drive which provides superior magnetic performance at high recording frequencies and less outputs after-write read noise.

What is claimed is:

1. A magnetic film comprising a multi-layered magnetic film which is formed by a body-centered cubic crystalline magnetic plated thin layer and a face-centered cubic crystalline magnetic plated thin layer;
    wherein the thickness of the body-centered cubic crystalline magnetic plated thin layer is larger than the thickness of the face-centered cubic crystalline magnetic plated thin layer;
    wherein the body-centered cubic crystalline magnetic plated thin layer and the face-centered cubic crystalline magnetic plated thin layer are 0.5 to 20 nm in thickness;
    wherein each layer of the multi-layered magnetic film has a different crystal structure from an immediately adjacent layer and epitaxial growth of each layer is broken by the immediately adjacent layer such that crystal grains of each layer are not larger than the thickness of their respective layer, and
    wherein the multi-layered magnetic film has at least four layers total of the body-centered cubic crystalline magnetic plated thin layer and the face-centered cubic crystalline magnetic plated thin layer alternately and sequentially stacked.

2. A magnetic film according to claim 1, wherein the total composition of the multi-layered magnetic film satisfies 15≦Ni≦60 wt % and 40≦Pe≦85 wt %.

3. A magnetic film according to claim 1, wherein the composition of the body-centered cubic crystalline magnetic plated thin layer satisfies 10≦Ni≦30 wt % and 70≦Fe≦90 wt % and the composition of the face-centered cubic crystalline magnetic plated thin layer satisfies 55≦Ni≦75 wt % and 25≦Fe≦45 wt %.

4. A thin film magnetic head comprising:
    a read head; and
    a write head which is located adjacent to the read head and has plural magnetic films;
    wherein at least one of the plural magnetic films constituting the write head comprises a multi-layered magnetic film which is fabricated by a body-centered cubic crystalline magnetic plated thin layer and a face-centered cubic crystalline magnetic plated thin layer;

wherein the thickness of the body-centered cubic crystalline magnetic plated thin layer is larger than the thickness of the face-centered cubic crystalline magnetic plated thin layer;

wherein either the body-centered cubic crystalline magnetic plated thin layer or the face-centered cubic crystalline magnetic plated thin layer are 0.5 to 20 nm in thickness wherein each layer of the multi-layered magnetic film has a different crystal structure from an immediately adjacent layer and epitaxial growth of each layer is broken by the immediately adjacent layer such that crystal grains of each layer are not larger than the thickness of their respective layer, and wherein the multi-layered magnetic film has at least four layers total of the body-centered cubic crystalline magnetic plated thin layer and the face-centered cubic crystalline magnetic plated thin layer alternately and sequentially stacked.

5. A thin film magnetic head according to claim 4, wherein the total composition of the multi-layered magnetic film satisfies $15 \leq Ni \leq 60$ wt % and $40 \leq Fe \leq 85$ wt %.

6. A thin film magnetic head according to claim 4, wherein the composition of the body-centered cubic crystalline magnetic plated thin layer satisfies $10 \leq Ni \leq 30$ wt % and $70 \leq Fe \leq 90$ wt % and the composition of the face-centered cubic crystalline magnetic plated thin layer satisfies $55 \leq Ni \leq 75$ wt % and $25 \leq Fe \leq 45$ wt %.

7. A thin film magnetic head according to claim 4, wherein the write head has a lower magnetic core, a coil and an upper magnetic core and at least one of the lower magnetic core and the upper magnetic core comprises a multi-layered magnetic film which is fabricated by alternately stacking a body-centered cubic crystalline magnetic plated thin layer and a face-centered cubic crystalline magnetic plated thin layer.

8. A thin film magnetic head according to claim 4, wherein the write head has an auxiliary magnetic pole, a coil, a main magnetic pole and a yoke and the auxiliary magnetic pole comprises a multi-layered magnetic film which is fabricated by alternately stacking a body-centered cubic crystalline magnetic plated thin layer and a face-centered cubic crystalline magnetic plated thin layer.

9. A thin film magnetic head according to claim 8, wherein the yoke comprises a multi-layered magnetic film formed by alternately stacking a face-centered cubic crystalline magnetic plated thin layer and a body-centered cubic crystalline magnetic plated thin layer.

* * * * *